United States Patent
Low et al.

(10) Patent No.: US 7,065,484 B2
(45) Date of Patent: Jun. 20, 2006

(54) METHOD AND SYSTEMS FOR SCREENING CHINESE ADDRESS DATA

(75) Inventors: Marie Mung Wah Low, Singapore (SG); Xin Yu, Xiamen (CN); Albert Cheh Wooi Tan, Penang (MY); Zhen Ming Xi, Shanghai (CN); Loy Lee, Penang (MY); Soon Tat Chan, Penang (MY)

(73) Assignee: Dell Products L.P., Round Rock, TX (US)

( * ) Notice: Subject to any disclaimer, the term of this patent is extended or adjusted under 35 U.S.C. 154(b) by 819 days.

(21) Appl. No.: 10/080,815

(22) Filed: Feb. 22, 2002

(65) Prior Publication Data

US 2003/0135359 A1    Jul. 17, 2003

(30) Foreign Application Priority Data

Jan. 17, 2002    (CN) ................................ 02 1 01736

(51) Int. Cl.
*G10L 21/06* (2006.01)
(52) U.S. Cl. .......................................... 704/8
(58) Field of Classification Search ..................... None
See application file for complete search history.

(56) References Cited

U.S. PATENT DOCUMENTS

| | | | | |
|---|---|---|---|---|
| 4,937,745 A | * | 6/1990 | Carmon | 715/535 |
| 5,276,616 A | * | 1/1994 | Kuga et al. | 704/10 |
| 5,832,428 A | * | 11/1998 | Chow et al. | 704/254 |
| 5,873,099 A | * | 2/1999 | Hogan et al. | 707/204 |
| 6,233,545 B1 | * | 5/2001 | Datig | 704/2 |
| 6,321,986 B1 | * | 11/2001 | Ackley | 235/462.01 |
| 6,393,445 B1 | * | 5/2002 | Chien | 715/536 |
| 6,400,287 B1 | * | 6/2002 | Ehrman | 341/55 |
| 6,848,080 B1 | * | 1/2005 | Lee et al. | 715/533 |

* cited by examiner

*Primary Examiner*—Susan McFadden
(74) *Attorney, Agent, or Firm*—Haynes and Boone, LLP (57) ABSTRACT

A system provides for identifying orders in an order management system which are to proscribed individuals or organizations having Chinese addresses. The Chinese address items of the order management database, and the Chinese address items of a database of proscribed individuals and organizations, are each converted into respective databases in a common writing system, namely the Pin Yin transliteration standard. In the conversion process, Simplified Mandarin items in the order management database which can be converted in multiple ways are converted in each of those ways. The converted items from the two Pin Yin databases are then compared.

16 Claims, 7 Drawing Sheets

Order: 4602249011

北 京 海 淀 区 永 定 路 51 号

(a)

| Double Byte Character | Pin Yin Conversion Possibilities |
|---|---|
| 北 | bei |
| 京 | jing |
| 海 | hai |
| 淀 | dian |
| 区 | gou; qu |
| 永 | yong |
| 定 | ding |
| 路 | luo; lu |
| 51 | 51 |
| 号 | xiao; hao |

(b)

bei jing hai dian gou qu yong ding luo lu 51 xiao hao (c)

FIG.5

| ID | NAME | BXA DPL ADDRESS | PIN YIN ADDRESS | SIMPLIFIED CHINESE ADDRESS |
|---|---|---|---|---|
| PIN-YIN-1 | MOHAMED, ABDUL KADER IBRAHIM | Jianguomenwai Diplomatic Housing Compound, Bldg 7-1, 5th FL Apartment 4 BEIJIN,CHINA(PRC) | ZHONGGUO BEIJING JIAN GOU MEN WAI WAI JIAO POU BU ZHU CHE ZHAI GOUQU 7-1, 5 LOU 4 CHANDANYUAN | 中国北京建国门外外交部住宅区 7-1，5 楼 4 单元 |
| PIN-YIN-2 | BEIJING INSTITUTE OF STRENGTH AND ENVIRONMENTAL ENGINEERING | No.36 Wanyuan Road BEIJING,CHINA(PRC) | ZHONGGUO BEIJING WAN YUAN LUOLU 36 HAO | 中国北京万园路 36 号 |
| PIN-YIN-3 | BEIJING INSTITUTE OF STRUCTURE AND ENVIRONMENTAL ENGINEERING | No.36 Wanyuan Road BEIJING,CHINA(PRC) | ZHONGGUO BEIJING WAN YUAN LUOLU 36 HAO | 中国北京万园路 36 号 |
| PIN-YIN-4 | BEIJING AEROSPACE AUTOMATIC CONTROL INSTITUTE | 51 Yong Ding Road BEIJING,CHINA(PRC) | ZHONGGUO BEIJING YONG DING LUOLU 51 HAO | 中国北京永定路 51 号 |
| PIN-YIN-5 | SHANGHAI ACADEMY OF SPACEFLIGHT TECHNOLOGY | Spaceflight Tower 222 Cao Xi Road SHANGHAI, CHINA(PRC) | ZHONGGUO SHANG AI CAO XI LUOLU 222 XIAOHAO HANG TIAN DAIDA XIASHA | 中国上海漕西路 222 号航天大厦 |
| PIN-YIN-6 | SHANGHAI INSTITUTE OF SPACE POWER-SOURCES | 388 Cang Wu Rd. SHANGHAI, CHINA(PRC) | ZHONGGUO SHANGHAI CHUANG CANG WU LUOLU 388 XIAOHAO | 中国上海仓武路 388 号 |
| PIN-YIN-7 | IRAQI AIRWAYS | Jianguomenwai Diplomatic Housing Compound Bldg.7-1 5th Floor Apartment 4 BEIJING,CHINA(PRC) | ZHONGGUO BEIJING JIAN GUO MEN WAI WAI JIAO POU BU ZHU CHE ZHAI GOUQU 7-1, 5 LOU 4 CHANDANYUAN | 中国北京建国门外外交部住宅区 7-1，5 楼 4 单元 |
| PIN-YIN-8 | JOINT REPRESENTATIVE OFFICE OF YUGOSLAV BANKS | Ta Yuan Cun-dipl. Office bldg.2-8-1 BEIJING,CHINA(PRC) | ZHONGGUO BEIJING DA TA YUAN CUN WAI JIAO BANGONG DAIDALOU 2-8-1 XIAOHAO | 中国北京塔元村外交办公大楼 2-8-1 号 |
| PIN-YIN-9 | GENERAL EXPORT BEIJING | Unit 08-06/07,Liang Ma Tower 8 North Dong San Huan Rd., Chao Yang District BEIJING,CHINA(PRC) | ZHONGGUO BEIJING ZHAOCHAOYANG GOUQU DONG SAN HUAN BEI LUOLU 8 XIAOHAO LIANG MA DAIDA XIASHA 08-06/07 | 中国北京朝阳区东三环北路 8 号亮马大厦 08-06/07 |

METHOD AND SYSTEMS FOR SCREENING CHINESE ADDRESS DATA

BACKGROUND

The present disclosure relates to methods and systems for comparing two databases of Chinese language items. In particular, the disclosure is applicable to permit comparison of items which are data such as addresses of individuals and/or organizations.

Multiple standards exist for writing Chinese text. Besides traditional Chinese character sets (which remain in widespread use in regions such as Taiwan and Hong Kong), texts in the People's Republic of China are written in Simplified Mandarin characters. Furthermore, Chinese may be transcribed into the Roman alphabet as "Pin Yin characters", or by other systems, such as the system defined by the ALA-LC romanization tables.

Conversion between the various standards is common. For example, one conventional order management system (SMARTS) requires that billing and shipping addresses are keyed in using Pin Yin characters, and the Pin Yin characters are then converted into double byte Simplified Mandarin characters for storage in the SMARTS database. Note, however, that not all conversions are unambiguous. For example, a single Simplified Mandarin character can correspond (in Pin Yin) to any of several sets of Roman letters. Similarly, a single set of Roman letters (in Pin Yin) may correspond to multiple Simplified Mandarin characters, and these Simplified Mandarin characters will have different meanings.

Because Chinese text in different databases may be stored using different standards, comparing the items in different databases is a difficult process. For example, the US Government has issued a "Denied Parties List" ("DPL") and transactions with parties on the list are forbidden. This list is only published in English (i.e. a mixture of conventional English words and transliterations into Roman letters of Chinese words) and there is no indication that in the future it will be translated into Simplified Mandarin Characters. For this reason it is difficult to compare the list with the names stored in an order management system such as SMARTS.

The difficulty of comparing the two lists leads to a risk that a supplier of products will erroneously supply products to parties on the DPL, leading to violations of the US Export Regulations. Such violations carry steep penalties which include, but are not limited to, monetary fines on the exporter (a corporation and/or individuals), possible imprisonment or denial of export privileges.

SUMMARY

The present disclosure addresses the above problem, and in particular provides methods and systems for comparing two databases which each include Chinese text data items such as addresses of entities which are individuals or organizations, and which employ different Chinese writing systems for the Chinese text data items.

In general terms the present disclosure proposes that the Chinese text items of both databases are converted into a common standard language, particularly the Pin Yin transliteration standard. In the conversion process, any items which may be converted in multiple ways are converted in each of those ways. The items in the two converted databases are then compared.

Specifically, a first aspect of the disclosure is a computer-implemented method for comparing two databases which each comprise Chinese text data items specifying addresses, the method comprising:

for each of the databases, converting any of the Chinese text data items which are not in a predefined common Chinese language format into that common format, any items in at least a first of the databases which are convertable into the common format in multiple ways being converted in all those ways to generate items in the common format; and comparing the data items in the common format, to identify Chinese text data items in the first database corresponding to Chinese text data items in the second database.

A second aspect the present disclosure proposes a computer system for comparing two databases which each comprise Chinese text data items specifying addresses, the computer system comprising:

a first conversion unit for converting the Chinese text data items of a first of the databases into a predefined common Chinese language format, any items in a first database which are convertable into the common format in multiple ways being converted in all those ways to generate items in the common format;

a second conversion unit for converting the Chinese text data items of the second of the databases into the common Chinese language format, and a comparison unit for comparing the converted data items to identify the Chinese text data items in the first database which correspond to Chinese text data items in the second database.

Note that if the data items in the second database are already in the common format, then the second conversion unit may be omitted.

The common Chinese language format is preferably Pin Yin characters. The first database may be an order management system having data items including shipping and/or billing address. The Chinese text data items in the first database may be in Simplified Mandarin characters. The second database may be in English or a combination of conventional English words and Pin Yin. For example, the second database may be some or all of the Denied Parties Listing issued by the US government.

"Chinese text data items" may be defined as the items which are in a Chinese language, such as Mandarin. Alternatively or additionally, "Chinese text data items" may be defined to include, or consist of, data items associated with addresses within designated Chinese territory, such as the People's Republic of China (which may be defined here to include, or to exclude, the territory of Hong Kong) and/or optionally any other territories where a Chinese language is in common use for billing and/or shipping (particularly one where Simplified Mandarin Characters are in common use).

Note that either database may, in addition to the Chinese text data items, include items which are not Chinese text data items. For example, the order management database may include data relating to parties which have no connection to China. Similarly, the second database (in the case that it is some or all of the DPL) includes items identifying entities for which the address is not within a specified Chinese territory. Preferably in each case, the conversion process only converts the Chinese items in each of the databases, and the comparison determines whether the converted items of the first database correspond to any of the converted items of the second database.

BRIEF DESCRIPTION OF THE DRAWINGS

Further advantages and features of the disclosure will be discussed in relation to an embodiment which is described, for the sake of example only, with reference to the following figures in which:

FIG. 6 shows the database of Pin Yin characters generated from the DPL by the method of FIG. 1.

DETAILED DESCRIPTION

Figure 1:
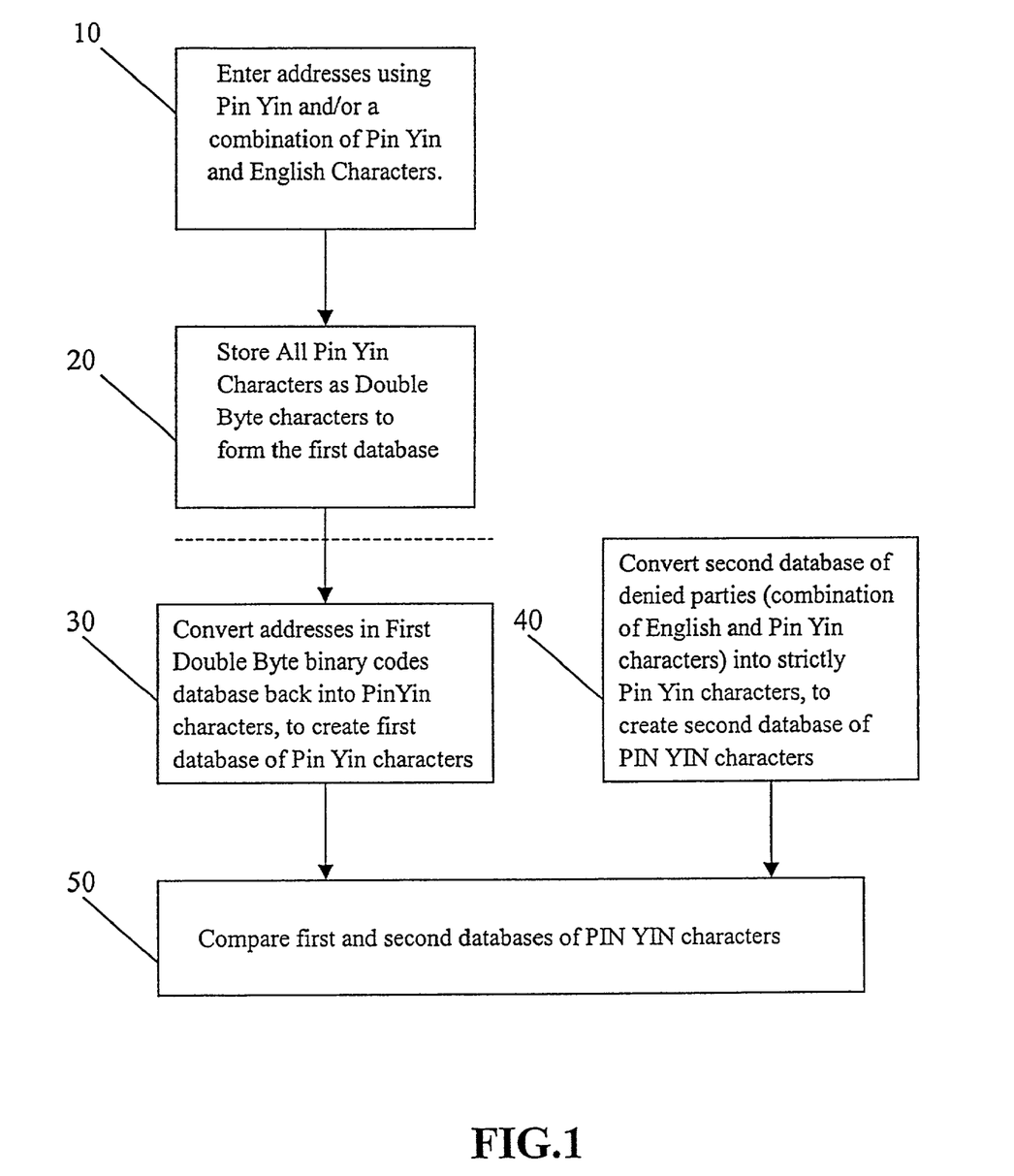
FIG. 1 is a block diagram illustrating a method which is an embodiment of the present disclosure.

FIG. 1 shows the steps of a method according to an embodiment for comparing the addresses of potential recipients of goods with at least part of the Denied Parties Listing (DPL). The method is performed by the system shown in FIG. 2.

Figure 2:
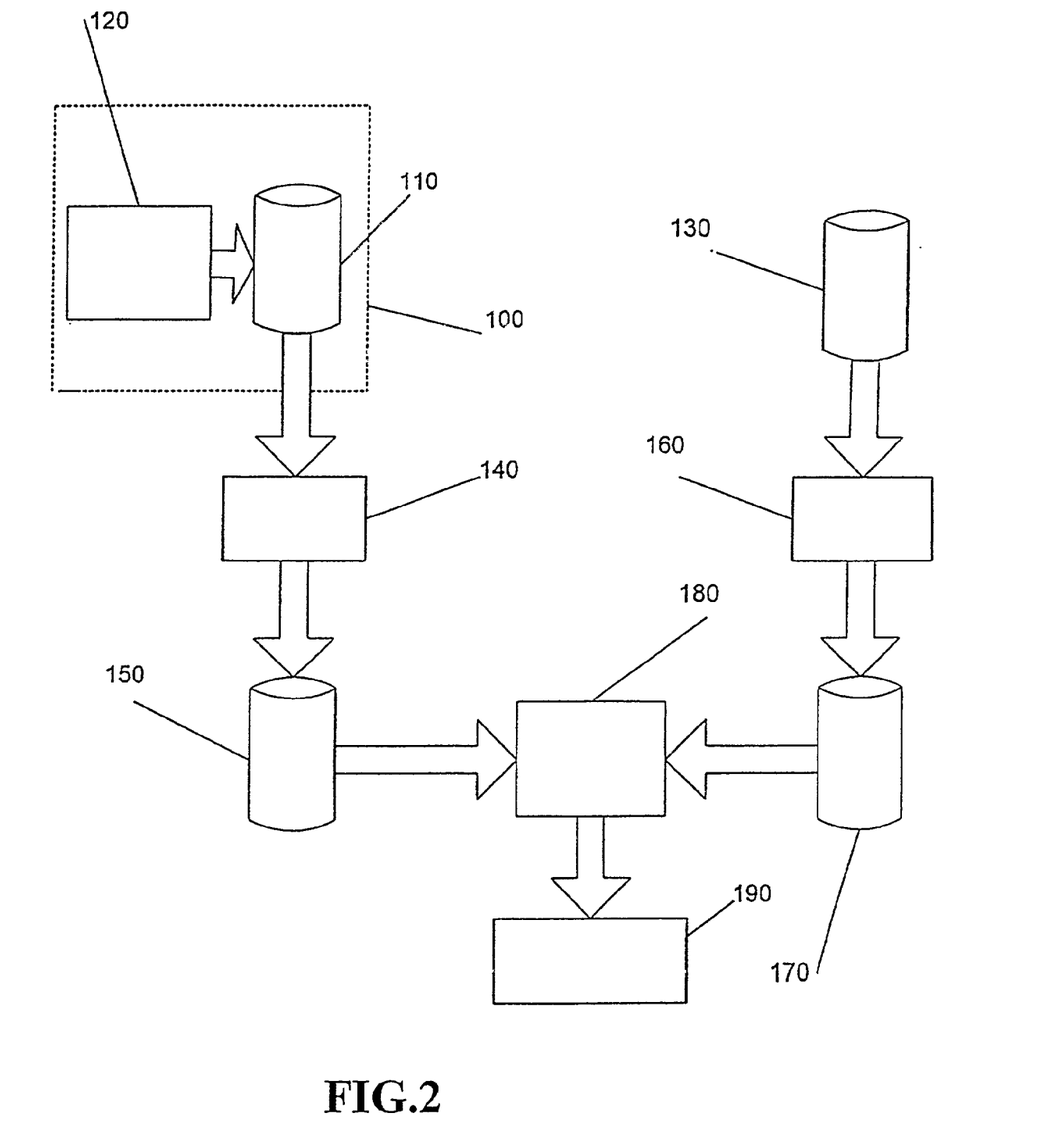
FIG. 2 is a block diagram of the structure of a system which is an embodiment of the present disclosure, and which performs the method of FIG. 1.

The system of FIG. 2 comprises an order management system 100, such as the SMARTS system, including a database 110 for storing shipping and/or billing addresses of individuals and/or companies which have placed orders or which are due to receive orders, and a data input device 120 for entering data using Pin Yin characters into the database 110. Only one data input device 120 is shown, but in practice there may be multiple such units.

The system further includes a second database 130 for storing the English-language DPL.

The system further includes a first conversion unit 140 for converting the Simplified Mandarin data items in the first database 110 into Pin Yin data items to form a first Pin Yin database 150. This process does not erase the database 120.

The system further includes a second conversion unit 160 for converting the English language data in the second database 130 into Pin Yin data items in a second Pin Yin database 170. This process does not erase the second database 130.

Finally, the system includes a comparison unit 180 for comparing the Pin Yin items in the first and second databases 150, 170, and an output unit 190 for notifying an operator of the system of any matches between items in the first and second Pin Yin databases 150, 170 which are discovered by the comparison unit 180.

The first two steps of the method of FIG. 1 (i.e. the ones above the dashed line in FIG. 1) are the known steps of entering data into the first database 110 of the order management system 100. Specifically, in step 10 users such as inside sales representatives use the data input devices 120 to enter data such as billing and shipping addresses into the order management system 100.

Figure 3:
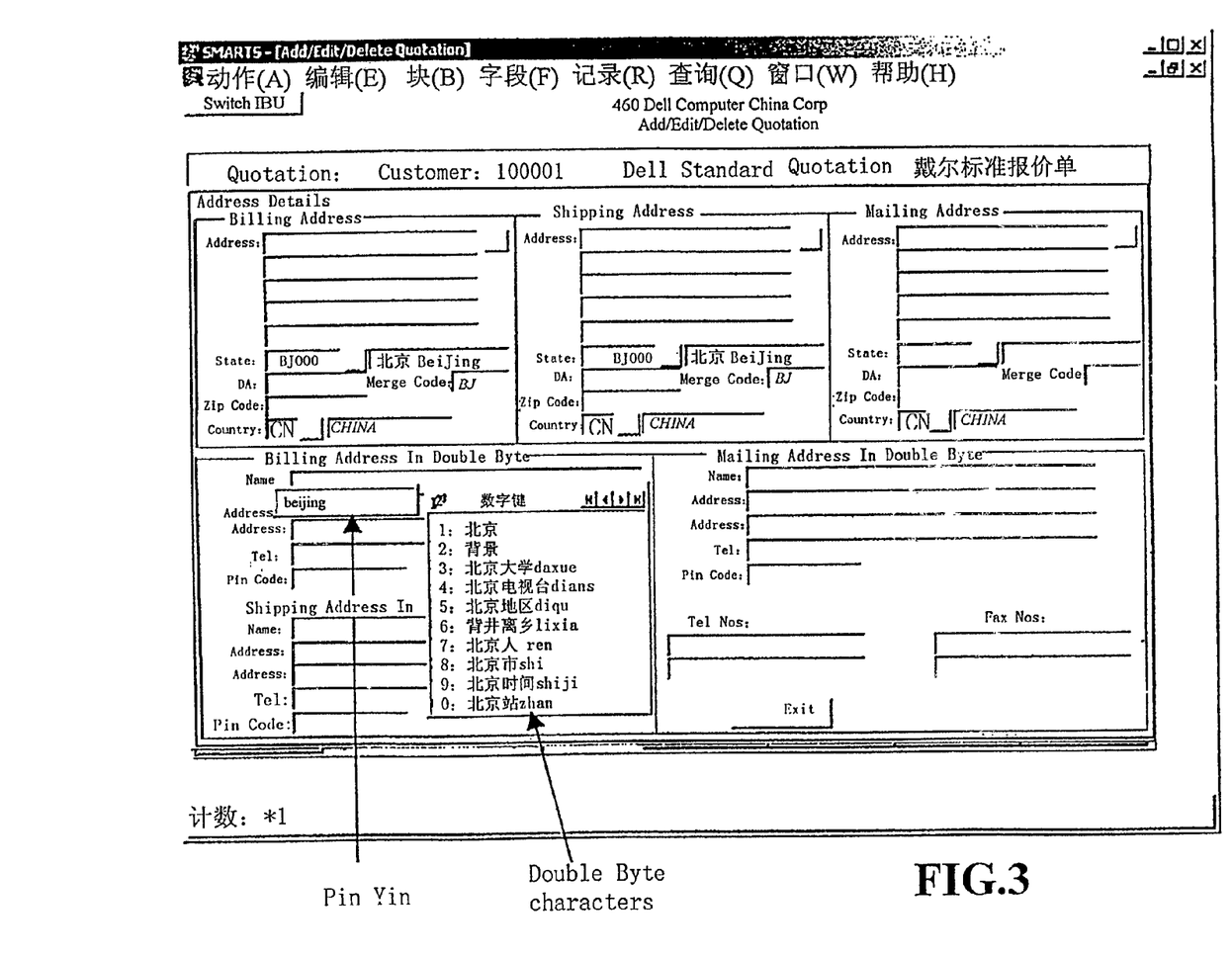
FIG. 3 shows a window presented by the system of FIG. 2, and used to generate addresses in Simplified Mandarin characters from Pin Yin characters.
Figure 4:
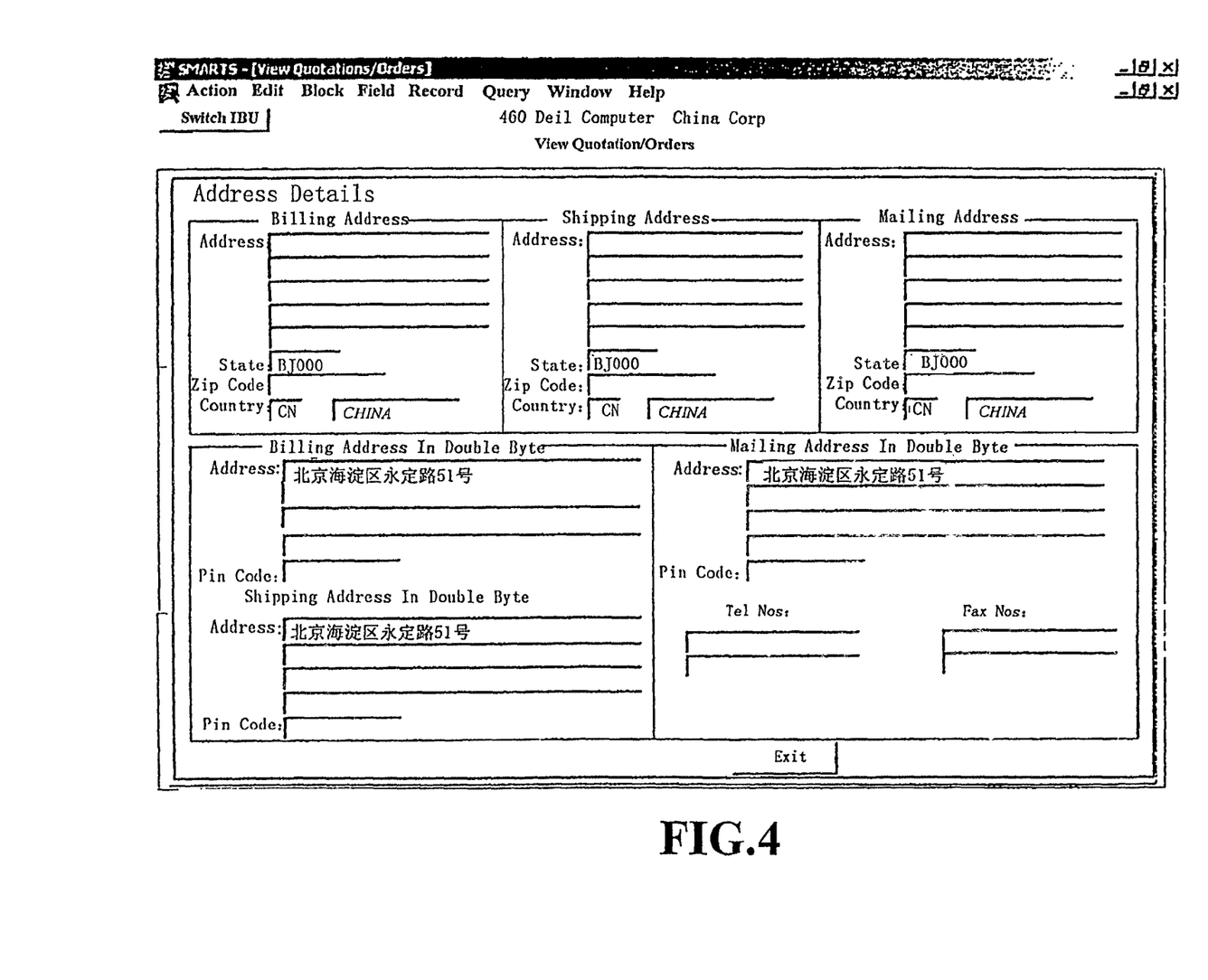
FIG. 4 is a window presented by the system of FIG. 2 and showing the addresses stored in the system in Simplified Mandarin characters.

A window presented to the user by the order management system 100 is shown in FIG. 3. Using this window, in step 20, and helped by user intervention, the order management system 100 converts the input data into Simplified Mandarin double byte characters, to form items in the first database 110. When items from the first database 110 are printed out they are in Simplified Mandarin, as is generally required for use on shipping and invoice documents. FIG. 4 shows an element from the second database, having the whole of the billing and mailing addresses written in double byte Simplified Mandarin characters. Note that the database 110 may contain further items which are not Chinese-related, and which are not relevant to the present disclosure. Such items, if they are already in the English language, may be compared directly with items (e.g. non-Chinese items) in the database 130 by known methods.

In step 30, the billing and shipping data which resides in the first database 110 in Simplified Mandarin double byte form is converted by the first conversion unit 140 into Pin Yin characters, to form items in the first Pin Yin database 150. As noted above, a single Simplified Mandarin character may correspond to multiple sets of Pin Yin characters, and these sets of Pin Yin characters will have different meanings. Hence, the first conversion unit 140 generates, for each Simplified Mandarin item in the first database 110, ALL the possible sets of Pin Yin characters which can be derived from that item, and each of these sets of Pin Yin characters forms an item in the database 150. We have determined that this "simplistic" process does not, however, compromise the integrity of the screening process.

Specifically, the conversion carried out in step 30 by the conversion unit 140 may be performed using a conversion file such as the default copy of the loaded Microsoft Windows 98 Simplified Chinese Operating System. The default file system location for each install can be found at c:\windows\system\winpy.com of each PC into which this operating system is installed.

Figure 5:
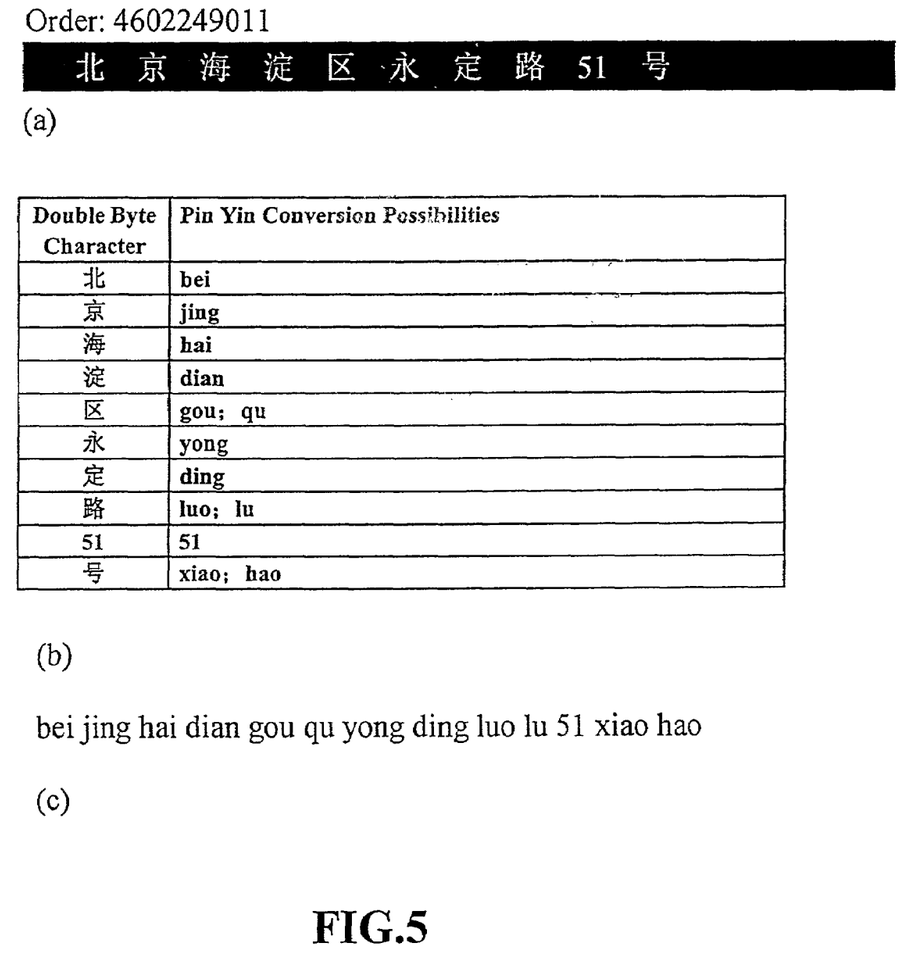
FIG. 5, which is composed of FIGS. 5(a) to 5(c), shows the steps of converting Simplified Mandarin Characters to Pin Yin characters in the method of FIG. 1.

FIG. 5 shows an example of the process of step 30. The address displayed in the window of FIG. 4 is order no. 4602249011 in the first database, as shown in FIG. 5(a). FIG. 5(b) shows the various ways in which each of the Simplified Mandarin characters can be converted into Pin Yin. Most only have one Pin Yin version, but three of them have two Pin Yin transliterations, of which one is shown shaded.

Using the table of FIG. 5(b), the string of Simplified Mandarin characters is converted into a string of Pin Yin characters. Each Simplified Mandarin character with multiple Pin Yin representations is converted as one representation followed by the other representation(s). This string is shown in FIG. 5(c) by indicating a first Pin Yin representation for each such Mandarin character followed by the other Pin Yin representation shaded.

In step 40, the Chinese addresses in the second database 130 are converted into Pin Yin by the second conversion unit 160 to form the items of the second Pin Yin database 160. Note that this conversion process must normally be performed manually by a Chinese speaking operator, though the process may in principle also be automated or semi-automated.

FIG. 6 illustrates the conversion operation. Each row corresponds to an entity on the DPL (labelled PIN_YIN_1 up to PIN_YIN_9). For example, the entity PIN_YIN_2 is the "Beijing Institute of Structure and Environmental Engineering". The US Government DPL includes an address for this entity of "No. 36 Wanyuan Road Beijin China (PRC)" (this address is labelled "BXA DPL address" in FIG. 6). Note that the address is a mixture of conventional English words (e.g. "Road") and Pin Yin (e.g. "Wanyuan"). In step 40, the BXA DPL address is converted (e.g. by an operator)

into a wholly Pin Yin address. For reference, the corresponding Simplified Chinese Address is shown in the right hand column of FIG. 6, though the generation of this column is not necessary to the present disclosure.

While in principle it would be possible to convert all the items in the DPL into Pin Yin, the present embodiment only converts the addresses of the Chinese items in the DPL. For example, "Chinese" in this context may be defined as the items which are addresses in the People's Republic of China and optionally other territories. By taking this "simplistic" approach, the number of conversions (and thus of subsequent comparisons) is much reduced. In general, this does not reduce the integrity of the screening, because the screening process is based on addresses, and addresses by their nature are not "mobile".

In step 50, a comparison is performed of the first and second Pin Yin databases 150, 170 to determine matches. This done by automatically extracting matches between the Pin Yin strings in the first database (e.g. the string shown in FIG. 5(c)), and the Pin Yin strings in the second database (the "Pin Yin addresses" column of FIG. 6.

Figure 7:
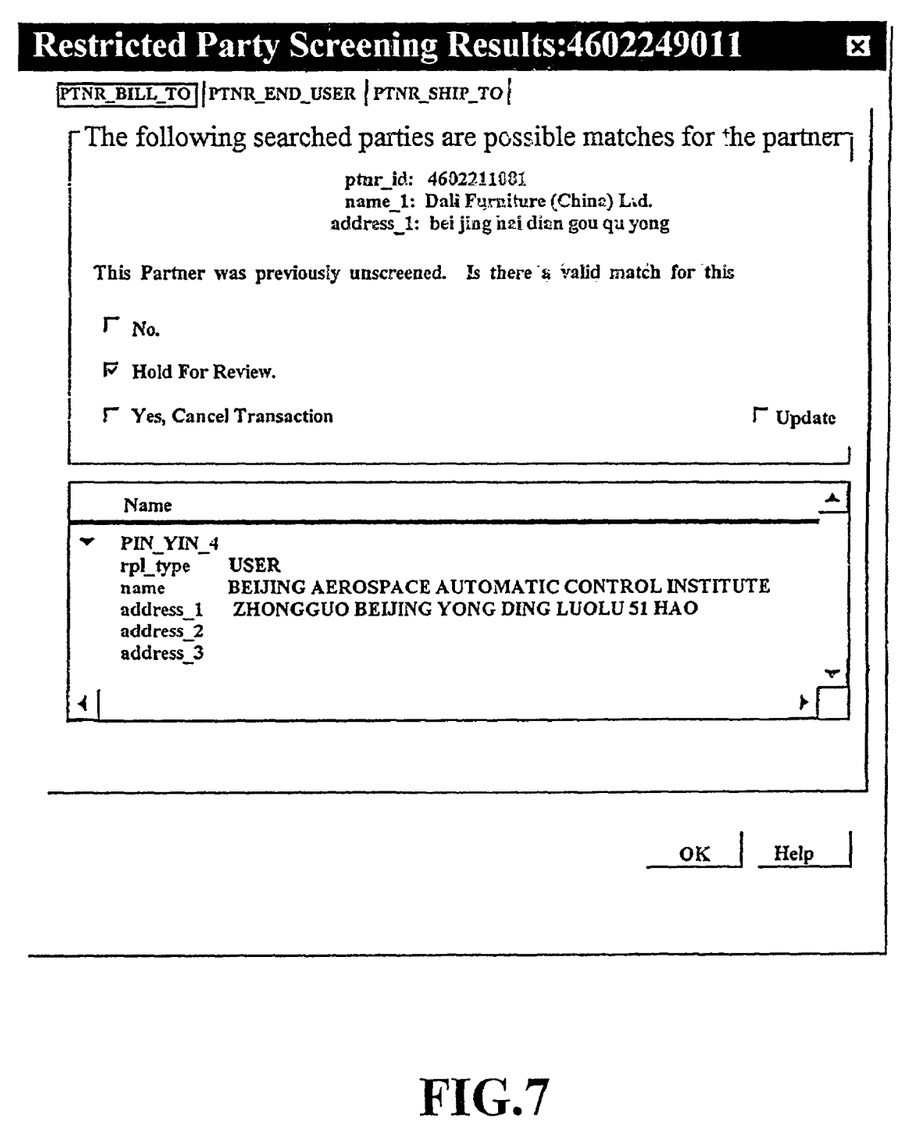
FIG. 7 is a window presented by the system of FIG. 2 showing the result of a comparison of two databases.

FIG. 7 shows a window optionally presented to the user by comparison unit 180 for the user to decide how the match is to be treated. As shown, a possible match has been found between order number 402211081 (shown in FIGS. 4 and 5, and in the upper part of FIG. 7) and entity PIN-YIN_4 in the list of FIG. 6 (shown in the lower part of FIG. 7). Note that the entity name in the DPL ("Beijing Aerospace Automatic Control Limited") is different from the name ("DaLi Furniture (China) Ltd.") in which the order was made; the embodiment has found the match based on the addresses alone. By entering ticks in appropriate option boxes in the window of FIG. 7 and then clicking on "OK", the user can indicate how the match is to be treated.

Step 50 may if desired be performed by a DPL compliance department of the organization operating the order management system. The matches can be incorporated into a local DPL, i.e. a list of parties (not necessarily the same as those on the US government's DPL) with which the organization operating the order management system refuses to transact business, at least without a screening operation. The local DPL may be subsequently used to add to an export management system for export compliance screening purposes as well as for the generation of export/shipping documents.

Thus, steps 30 and 40 have resulted in a common platform (Pin Yin), enabling in step 50 the compliance screening of addresses of China orders.

The embodiment may be operated in a batch mode in which a plurality of items in the first database 110 (e.g. all the Chinese items in the first database 110) are converted into Pin Yin items one after another (e.g. as a continuous sequence) to form the database 150, and later each of the converted items in the database 150 are compared (e.g. one after another) with the converted items of the second database 170.

Alternatively, step 30 may be performed for the items of the first database 110 individually (for example, whenever a new item is added to the first database 110), and step 50 may be performed for the resultant items in the database 150 by comparing the individual converted items with all the converted items of the second Pin Yin database 170. If no matches are found, the contents of the database 150 may be discarded. In other words, in this variant of the embodiment, the first Pin Yin database 150 need not contain at any time more than the number of Pin Yin items which are derived from a single one of the Simplified Mandarin items in the database 110.

The comparison in step 50 may be performed as described above. If any matches are found, the output unit 190 is used to notify an operator of the system, who may cancel the corresponding order. Alternatively, though less preferably, the order may be cancelled automatically.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer-implemented method for comparing multiple databases which each comprise Chinese text data items specifying addresses, the method comprising:
for each of the databases, converting any of the Chinese text data items which are not in a predefined common Chinese language format into that common format, any items in double-byte form in at least a first of the databases which are convertible into the common format in multiple ways being converted in all those ways in a first string of representations; and
comparing the data items in the common format, to identify Chinese text data items in the first database corresponding to Chinese text data items in a second string of representations in a second of the databases.

2. The method of claim 1 wherein the common Chinese language format is Pin Yin characters.

3. The method of claim 1 wherein the first database is a database of an order management system and includes data items including a corresponding shipping and/or billing addresses.

4. The method of claim 1 wherein the Chinese text data items of the first database are in Simplified Mandarin characters.

5. The method of claim 1 wherein the second database is a list of proscribed parties issued by a governmental organization.

6. The method of claim 1 wherein data items of the second database which do not include an address within at least one specified Chinese territory are not converted into the common format.

7. The method of claim 1 wherein upon the comparison of the Chinese text data items in the common format a match between them is found, the corresponding item of the first database is removed.

8. A computer system for comparing multiple databases which each comprise Chinese text data items specifying addresses, the computer system comprising:
a first conversion unit for converting the Chinese text data items of a first of the databases into a predefined common Chinese language format, any items in double-byte form in a first database which are convertible into the common format in multiple ways being converted in all those ways in a first string of representations to generate items in the common format;
a second conversion unit for converting the Chinese text data items of a second of the databases into the common Chinese language format; and a comparison unit for comparing the converted data items to identify the Chinese text data items in the first database which correspond to Chinese text data items in a second string of representations in the second database.

9. The system of claim 8 wherein the common Chinese language format is Pin Yin characters.

10. The system of claim 8 wherein the first database is a database of an order management system and includes Chinese text data items including a corresponding shipping and/or billing address.

11. The system of claim 8 wherein the Chinese text data items of the first database are in Simplified Mandarin characters.

12. The system of claim 8 wherein the second database is a list of proscribed parties issued by a governmental organization.

13. The system of claim 8 wherein the second conversion unit does not convert data items of the second database which do not include an address within at least one specified Chinese territory.

14. The system of claim 8 wherein the comparison unit is arranged, upon detecting a match between the Chinese text data items in the common format, to operate output means to signal that the corresponding item of the first database should be removed.

15. The system of claim 8 wherein the comparison unit is arranged, upon detecting a match between the Chinese text data items in the common format, to remove the corresponding item from the first database.

16. A system for handling information including multiple databases for Chinese text data items comprising:

means for converting in each of the databases, any of the Chinese text data items which are not in a predefined common Chinese language format into that common format, any items in double-byte form in at least a first of the databases which are convertible into the common format in multiple ways being converted in all those ways in a first story of representations; and a comparison unit for comparing the converted data items to identify the Chinese text data items in the first database which correspond to Chinese text data items in a second string of representations in a second database.

* * * * *